(12) United States Patent
Brommer

(10) Patent No.: US 6,233,443 B1
(45) Date of Patent: May 15, 2001

(54) APPARATUS AND METHOD FOR REDUCING CO-CHANNEL RADIO INTERFERENCE

(75) Inventor: Karl D. Brommer, Hampton Falls, NH (US)

(73) Assignee: Transcept, Inc., Manchester, NH (US)

( * ) Notice: Subject to any disclaimer, the term of this patent is extended or adjusted under 35 U.S.C. 154(b) by 0 days.

(21) Appl. No.: 09/459,513

(22) Filed: Dec. 13, 1999

Related U.S. Application Data

(63) Continuation of application No. 08/526,939, filed on Sep. 12, 1995, now Pat. No. 6,029,053.

(51) Int. Cl.[7] ............................................ H04B 1/10
(52) U.S. Cl. ........................ 455/296; 455/212; 455/225
(58) Field of Search ................................... 455/212, 225, 455/296, 213, 218, 221, 303, 63

(56) References Cited

U.S. PATENT DOCUMENTS

| | | |
|---|---|---|
| 4,342,120 | 7/1982 | Settlemire et al. . |
| 4,541,118 | 9/1985 | Eastmond et al. . |
| 4,829,592 | 5/1989 | Wieschhoff et al. . |
| 4,914,715 | 4/1990 | Miyata . |
| 4,965,850 | 10/1990 | Schloemer . |
| 5,014,343 | 5/1991 | Place . |
| 5,023,940 | 6/1991 | Johnson et al. . |
| 5,410,751 | 4/1995 | Yokohama . |
| 5,416,802 | 5/1995 | Ishii . |
| 5,490,166 | 2/1996 | Heinzelmann . |

*Primary Examiner*—Vivian Chang
*Assistant Examiner*—Sam Bhattacharya
(74) *Attorney, Agent, or Firm*—Kirkpatrick & Lockhart LLP

(57) ABSTRACT

An apparatus and method reducing interference between multiple frequency modulated, FM, voice transmissions present in the same frequency bandwidth by receiving a radio signal which includes a first FM voice signal to be demodulated along with one or more additional FM voice signals which are present within a modulation bandwidth of the first FM voice signal, detecting the presence of a carrier frequency signal of the first FM signal and determining a lack of modulation of the detected carrier frequency signal by a voice signal, and squelching the received signal when the carrier signal is unmodulated.

26 Claims, 2 Drawing Sheets

APPARATUS AND METHOD FOR REDUCING CO-CHANNEL RADIO INTERFERENCE

CROSS-REFERENCE TO RELATED APPLICATIONS

The present application is a continuation of U.S. patent application Ser. No. 08/526,939, filed Sep. 12, 1995, now U.S. Pat. No. 6,029,053.

STATEMENT REGARDING FEDERALLY SPONSORED RESEARCH AND DEVELOPMENT

Not Applicable

BACKGROUND OF THE INVENTION

1. Field of the Invention

The present invention generally relates to frequency modulated radio transmission of voice signals, and particularly to the reduction of interference when more than one signal is received within the same bandwidth.

2. Statement of the Prior Art

The interception of frequency modulated, FM, voice signals in the presence of similar Interfering or cochannel signals, has long been a perplexing and difficult problem to solve. This problem encompasses the reception, separation and demodulation of one or more voice signals when more than one signal is present within the same modulation bandwidth. The nature of cochannel interference between a plurality of signals varies temporally and chaotically depending upon the presence and content of each modulated signal. An apparatus for the separation and demodulation of such signals would benefit from the ability to adjust to this temporal variation.

SUMMARY OF THE INVENTION

Accordingly, it is an object of the present invention to provide a method and apparatus for separating and demodulating one or more frequency modulated signals from a plurality of such signals present in an overlapping modulation bandwidth.

It is a further object of the present invention to provide such separation and demodulation in a temporal manner to compensate for signal variations.

In one form, the present invention provides a method for reducing interference between multiple frequency modulated, FM, voice transmissions present in the same frequency bandwidth, comprising the steps of receiving a radio signal which includes a first FM voice signal to be demodulated along with one or more additional FM voice signals which are present within a modulation bandwidth of the first FM voice signal, detecting the presence of a carder frequency signal of the first FM signal and determining a lack of modulation of the detected carrier frequency signal by a voice signal, and squelching the received signal when the carrier signal is unmodulated.

In another form, the present invention provides an apparatus for reducing interference between multiple frequency modulated, FM, voice transmissions present in the same frequency bandwidth, comprising means for receiving a radio signal which includes a first FM voice signal to be demodulated along with one or more additional FM voice signals which are present within a modulation bandwidth of the first FM voice signal, means for detecting the presence of a carrier frequency signal of the first FM signal, means for determining a lack of modulation of the detected carrier frequency signal by a voice signal, and means for squelching the received signal when the carder signal is unmodulated.

In yet another form, the present invention provides an apparatus and method for determining the relative strength of a first frequency modulated, FM, signal having a carrier frequency signal and located within a transmission bandwidth in which one or more other FM signals are also present, comprising receiving transmission energy within the transmission bandwidth, demodulating the received transmission energy to an intermediate frequency signal, digitizing the intermediate frequency signal, digitally demodulating the intermediate frequency signal to a baseband signal, digitally measuring the power level of the baseband signal, digitally filtering the baseband signal to separate the carrier frequency signal of the first FM signal, digitally measuring the power of the separated carrier frequency signal, and comparing the measured power of the carrier frequency signal to the measured power of the baseband signal.

BRIEF DESCRIPTION OF THE DRAWINGS

The present invention is illustratively described in reference to the appended drawings in which.

DETAILED DESCRIPTION OF THE DRAWINGS

Figure 1:
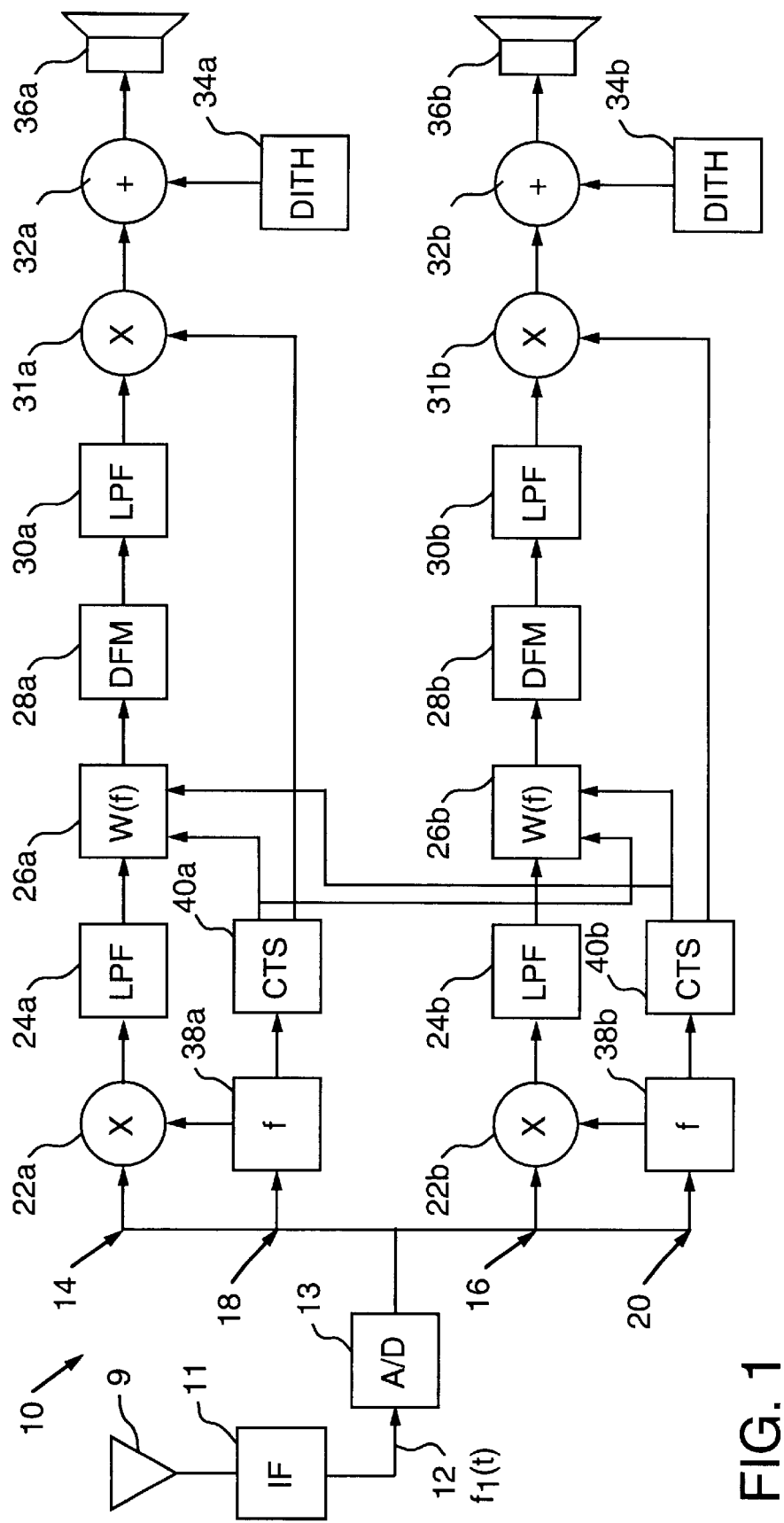
FIG. 1 is a signal flow diagram of a cochannel interference reduction processor constructed in accordance with one embodiment of the present invention.

FIG. 1 shows a cochannel demodulator 10 suitable for simultaneously and separately demodulating two frequency modulated, FM, voice signals present within the same modulation bandwidth. FM signals are first received by antenna 9, and a predetermined bandwidth of interest is separated by filtering and reduced to an intermediate signal by an IF demodulator 11. This i.f. signal is represented by the $f_1(t)$ signal 12 and is digitized by A/D converter 13. The remainder of demodulator 10 is implementable in software for a programmable signal processor or as special purpose signal processing hardware.

The two FM voice signals present within the digitized i.f. signal are demodulated separately by first and second signal demodulation paths 14,16, respectively. Demodulation paths 14, 16 are paired with separate, first and second, carrier signal tracking paths 18,20, respectively. Demodulation paths 14, 16 are substantially identical to each other as are carrier tracking paths 18,20. For this reason, the same reference numbers, with a difference only in the letter suffix, are used for identical elements.

Separate Carrier tracking paths 18,20 are used to distinguish each separate signal in a modulation bandwidth. Separate demodulation paths 14, 16 are used for each signal to be demodulated. Additional cochannel signals may also be distinguished and demodulated with the present embodiment by adding, or duplicating, carrier tracking and demodulation paths, respectively.

All of the demodulation paths 14, 16 and tracking paths 18,20 are fed with the $f_1(t)$ signal 12 after it is converted by an analog-to-digital converter 13. The inputted signal 12 is typically at an intermediate frequency which determines the sampling rate of converter 13. Such sampling rate may be on the order of 100 KHz.

Each demodulation path 14, 16 includes the same series connected elements, namely a baseband mixer 22a,22b, a low-pass filter/decimator 24a,24b, an adaptive filter 26a, 26b, a digital demodulator 28a,28b, a low-pass filter 30a, 30b, a squelch multiplier 31a,31b, an adder 32a,32b, a noise generator 34a,34b and an output element 36a,36b. Each tracking path 18,20 includes a carrier frequency tracker/synthesizer 38a,38b and a squelch detector 40a,40b.

The first demodulation path 14 and its corresponding carrier signal tracking path 16 function in the following manner. Carrier frequency tracker 38a determines the separate carrier frequencies present in the digitized signal and estimates the frequency of the strongest signal with a phase-locked loop or a digital technique such as a discrete Fourier transform. This estimate is periodically updated to take into account motion of transmitters which might change the relative strengths and frequencies of the cochannel signals. Energy is only sporadically present at the carrier frequency of an FM signal as modulation of the carrier by a voice signal disperses the energy over the modulation bandwidth. Tracker/synthesizer 38a detects intervals of carrier energy, differentiates the strongest carrier signal and synthesizes that carrier frequency for use in demodulation.

The synthesized carrier signal output of tracker 38a is coupled to mixer 22a which converts the modulated voice signal 14a to baseband. Mixing is done digitally through a semi-complex multiplication. This baseband signal is then filtered and decimated in filter 24a to reduce the data rate and the required volume of digital computation.

Figure 2:
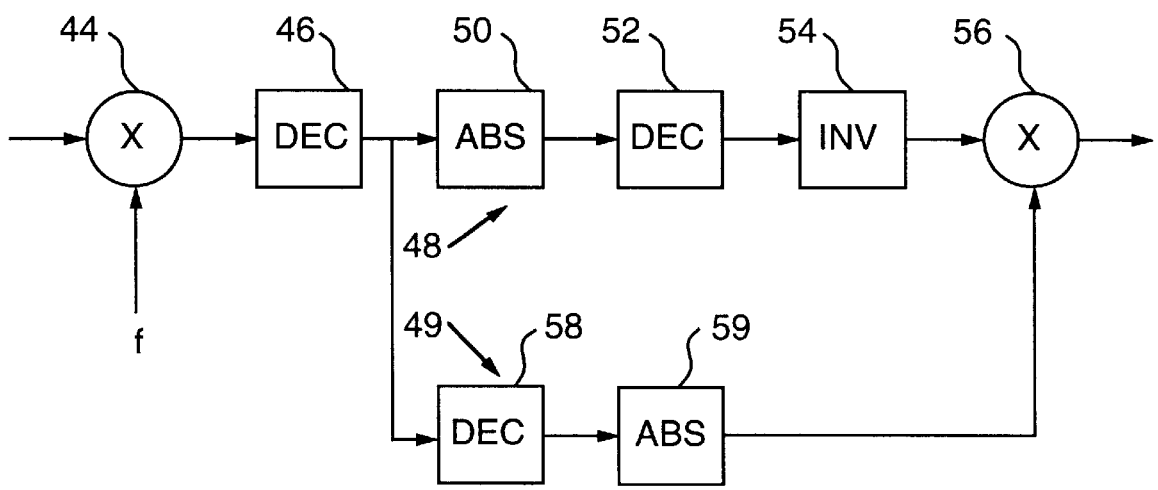
FIG. 2 is a signal flow diagram of a portion of the processor of FIG. 1.

The frequency estimate from tracker 38a is also fed into the carrier detector 40a, which is described in more detail reference to FIG. 2. By monitoring the carrier power level and overall signal power level, carrier detector 40a determines whether its respective cochannel communicator is silent or speaking at any given time. The presence of a carrier signal energy indicates that the speaker is not talking and the frequency and power level of the carrier in this condition is signaled to squelch multiplier 31a and all nonrespective adaptive filters 26b.

Carrier detector 40a optionally determines whether the respective voice signal is sounding a vowel or a consonant. Detected vowel signals are coupled to the adaptive filters 26a,26b of all of the present demodulator paths 14, 16.

Adaptive filter 26a receives the demodulated baseband signal from filter 24a, signals representing the frequency and power of unmodulated carrier signals from non-respective squelch detector 40b, signals representing the presence of vowel sounds from its respective squelch detector 40a and signals representing the presence of vowel sounds in a cochannel communicators signal from non-respective carrier detector 40b.

Adaptive filter 26a then filters the baseband signal in accordance with the received carrier and vowel signals. In the simplest form of adaptive filter 26a, carrier signal energy from cochannel communicators 16b is filtered from the mixed signal 14a.

The use of vowel sounds is an optional form of filtering. Vowel sounds typically contain a large amount of signal power and thus play a substantial role in interference. Where a vowel sound is detected in respective signal 14a the base frequency and respective harmonics of the vowel sound are allowed to pass by filter 26a, and the remaining frequency components are filtered out. Where a vowel sound is detected in a cochannel signal 16b, its base frequency and harmonics are filtered from the signal 14a.

The output of adaptive filter 26a is demodulated with a conventional digital FM demodulator 28a. The demodulated signal is low-pass filtered in 30a before being coupled to squelch multiplier 31a.

Squelch is accomplished by multiplying the demodulated signal 14a in response to the presence of carrier signal energy in the respective carrier detector 40a. As mentioned, the presence of carrier signal energy indicates that the respective voice signal is not present In this case the multiplier for the voice signal 14a is zero. The absence of carrier signal energy indicates that voice signal is present and the corresponding multiplier for 31a is one. This squelch technique removes much of the perceived background noise because, when a carrier is not modulated, a weak interfering signal with an active speaker will capture the strong signal demodulator and make the weak signal perceptible on the strong signal channel.

A small amount of noise in the form of random digital words from dither element 34a is added to the squelched signal in adder 32a, to soften the transitions between squelched and unsquelched portions of the output. The resulting enhanced voice signal may then be outputted or further processed by any suitable audio device 36a

The minimum arrangement of the previously described circuit which is effective at reducing cochannel interference, only uses the output of detector 40a to control the squelch multiplier 31a. In such an arrangement, adaptive filter 26a may be eliminated. As mentioned, during periods when a strong signal is not modulated, a weak signal can capture the receivers strong signal demodulator thus introducing significant noise and removing some of the perceptibility of sounds.

Adaptive filter 26 may also be implemented with less than all of the described functionality. The simple form of the adaptive filter 26a, which only removes carrier tones correlates the strong signal data with a sinusoid at the weak carrier frequency and subtracts the correlation product times the weak carrier from the strong signal. To also remove vowels, a more sophisticated adaptive filter based on well known Wiener smoothing techniques can be used. The full use adaptive filter 26a would then include the enhancement of strong signal vowel sounds and the removal of weak signal vowel sounds during the specific intervals when those sounds were present.

FIG. 2 shows further detail of the carrier tracker 40a, 40b. The digital stream from converter 13 is fed to a multiplier 44 where it is digitally tuned through semi-complex multiplication with a complex sinusoid at the estimated carrier frequency from the carrier frequency tracker/synthesizer 38. This demodulates the signal to base band where it is filtered and decimated at 46. This signal takes two separate paths 48,49 which determine overall signal power and carrier frequency power respectively.

Signal power path 48 first takes the absolute power 50, averages the value with filtering and decimation at 52 and inverts the value at 54 prior to multiplication at 56. Carrier signal power path 49 first filters or decimates the modulation signal at 58 and then takes the absolute value 59 of the signal level. Multiplier then multiplies the carrier power by the reciprocal of the overall signal power to provide a carrier power fraction at output 60.

Carrier power fraction output 60 fluctuates continuously between zero and one. The low values near zero occur when the tracked signal modulates its carrier. The high values near one occur when the tracked signal is unmodulated. Minima of this ratio occur wherever the communicator utters a sound, thereby modulating the FM signal. In these cases, the carrier power fraction is low because the instantaneous frequency of the FM signal is far removed from the carrier frequency. These minima occur whether or not another interfering signal is present. Thus, this carrier power fraction is immune to interference from other signals. From the maximum value of the carrier power fraction for every signal in the modulation bandwidth, the carrier to interference, C/I, ratios may be determined. These C/I ratios are used to set the null depths of adaptive filters 26a,26b. From the rate of fluctuation of the minima in the carrier power fraction, it may be determined whether a speaker is uttering a consonant or a vowel. This information may be used to tune more complex adaptive filters.

The present invention is applicable to any type of FM voice signal transmission and particularly useful for analog cellular telephone systems. Cell phone systems depend heavily upon frequency reuse where separate cell phone users located beyond some separation distance are assigned to maintain independent communications on the same frequency channel. Frequency reuse is possible because the received signal power drops as the square of the distance from the transmitter. Beyond some minimum separation distance cochannel user interference is tolerable by the cell phone demodulators.

The present invention provides an improved demodulator that provides acceptable audio quality at lower carrier-to-interference ratios, allowing cell phone service providers to assign the same channel to more closely spaced signals. Installing these demodulators in existing cellular telephone base stations will increase the customer capacity of the cellular telephone system without any other changes to the infrastructure. This modification costs much less than adding frequency channels, special antennas or base stations. The modification also provides the fastest, most economical solution to fixing poor channel coverage in existing base station frequency plans.

The present invention is also useful in analyzing multipath propagation problems which can plague cell phone systems in urban areas and are especially acute in moving vehicles. These fluctuations in signal strength produce annoying static in the audio loudspeaker. The carrier tracking circuit of the present invention can detect these fluctuations, and by digitally interpolating through the duration of the multipath fade, the click is removed and replaced with the missing speech.

Further, the carrier tracking demodulator of the present invention may be combined with cell phone locating equipment installed at cell phone base stations for the purpose of mapping signal strength patterns in a cell system's area of coverage and particularly in areas where cochannel interference is problematic. Such mapping allows the service provider to improve system coverage by reallocating channels and adjusting antennas. The current approach to collecting this information requires driving around in one or more trucks while the channels are taken out of use.

The present invention enjoys the advantage of not requiring any special antennas and thereby being readily applicable to various systems using anything from a simple omnidirectional antenna to a complex beam forming array.

The embodiments described above are intended to be taken in an illustrative and not a limiting sense. Various modifications and changes may be made to the above embodiments by persons skilled in the art without departing from the scope of the present invention as defined in the appended claims.

What is claimed is:

1. A method for reducing interference between first and second interfering frequency modulated (FM) voice signals present in a frequency bandwidth, comprising:

receiving a radio signal including the first and second interfering FM voice signals;

digitizing the radio signal;

detecting a first carrier frequency of a first carrier signal for the first FM voice signal from the digitized radio signal;

determining a period of non-modulation of the first carrier signal during a portion of the first FM voice signal; and squelching the first FM voice signal during the portion of the first FM voice signal when the first carrier signal is non-modulated.

2. The method of claim 1, wherein determining a period of non-modulation of the first carrier signal includes determining a power ratio between the first carrier signal and the received radio signal.

3. The method of claim 1, wherein detecting the first carrier frequency includes detecting a carrier signal having the strongest frequency.

4. The method of claim 1, further comprising:

detecting a second carrier frequency of a second carrier signal for the second FM voice signal from the digitized radio signal;

demodulating the first FM voice signal to a first baseband signal in response to the first carrier signal; and filtering the second carrier signal from the first baseband signal.

5. The method of claim 4, wherein filtering the second carrier signal from the first baseband signal is performed prior to squelching the first FM voice signal.

6. The method of claim 4, further comprising:

detecting modulation of the first carrier signal by a first vowel sound of the first FM voice signal;

determining frequency characteristics of the first vowel sound; and adaptively filtering the first baseband signal to enhance the frequency characteristics of the first vowel sound.

7. The method of claim 6, further comprising:

determining a period of non-modulation of the second carrier signal during a portion of the second FM voice signal; and squelching the second FM voice signal during the portion of the second FM voice signal when the second carrier signal is non-modulated.

8. The method of claim 7, further comprising:

demodulating the second FM voice signal to a second baseband signal in response to the second carrier signal; and filtering the first carrier signal from the second baseband signal.

9. The method of claim 8, further comprising:

detecting modulation of the second carrier signal by a second vowel sound of the second FM voice signal;

determining frequency characteristics of the second vowel sound; and adaptively filtering the second baseband signal to enhance the frequency characteristics of the second vowel sound.

10. An apparatus for reducing interference between first and second interfering frequency modulated (FM) voice signals present in a frequency bandwidth, comprising:

a converter for digitizing a received radio signal, the radio signal including the first and second FM voice signals;

a first carrier frequency tracker in communication with the converter for detecting a first carrier frequency of a first carrier signal for the first FM voice signal from the digitized radio signal;

a first carrier detector in communication with the first carrier frequency tracker for determining a period of non-modulation of the detected first carrier signal during a portion of the first FM voice signal; and a first squelch multiplier in communication with the first carrier detector for squelching the first FM voice signal during the portion of the first FM voice signal when the first FM voice signal is non-modulated.

11. The apparatus of claim 10, wherein the first carrier detector outputs a first signal to the first squelch multiplier, wherein the first signal is indicative of whether the first carrier signal is modulated by the first FM voice signal.

12. The apparatus of claim 11, wherein the first carrier detector determines whether the first carrier signal is modulated by the first FM voice signal based on a power ratio between a power level of the received radio signal and a power level of the first carrier signal.

13. The apparatus of claim 11, further comprising a first mixer in communication with the first carrier frequency tracker for converting the first carrier signal to a first baseband signal.

14. The apparatus of claim 13, further comprising a first adaptive filter in communication with the first mixer and in communication with the first squelch multiplier.

15. The apparatus of claim 14, further comprising;

a second carrier frequency tracker in communication with the converter for detecting a second carrier frequency of a second carrier signal for the second FM voice signal from the digitized radio signal; and a second carrier detector in communication with the second carrier frequency tracker for determining a period of non-modulation of the second carrier signal during a portion of the second FM voice signal.

16. The apparatus of claim 15, wherein the first adaptive filter is in communication with the second carrier detector for filtering the second carrier signal from the first baseband signal.

17. The apparatus of claim 16, wherein the first carrier detector detects modulation of the first carrier signal by a first vowel sound of the first FM voice signal and determines frequency characteristics of the first vowel sound.

18. The apparatus of claim 17, wherein:

the first carrier detector outputs a second signal to the first adaptive filter indicative of the frequency characteristics of the first vowel sound; and the first adaptive filter adaptively filters the first baseband signal to enhance the frequency characteristics of the first vowel sound.

19. The apparatus of claim 18, further comprising a second squelch multiplier in communication with the second carrier detector for squelching the second FM voice signal during the portion of the second FM voice signal when the second FM voice signal is non-modulated.

20. The apparatus of claim 19, wherein the second carrier detector outputs a third signal to the second squelch multiplier, wherein the third signal is indicative of whether the second carrier signal is modulated by the second FM voice signal.

21. The apparatus of claim 20, wherein the second carrier detector determines whether the second carrier signal is modulated by the second FM voice signal based on a power ratio between the power level of the received radio signal and a power level of the second carrier signal.

22. The apparatus of claim 21, further comprising a second mixer in communication with the second carrier frequency tracker for converting the second carrier signal to a second baseband signal.

23. The apparatus of claim 22, further comprising a second adaptive filter is in communication with the second mixer and in communication with the second squelch multiplier.

24. The apparatus of claim 23, wherein the second adaptive filter is in communication with the first carrier tracker for filtering the first carrier signal from the second baseband signal.

25. The apparatus of claim 24, wherein the second carrier detector detects modulation of the second carrier signal by a second vowel sound of the second FM voice signal and determines frequency characteristics of the second vowel sound.

26. The apparatus of claim 25, wherein:

the second carrier detector outputs a fourth signal to the second adaptive filter indicative of the frequency characteristics of the second vowel sound; and the second adaptive filter adaptively filters the second baseband signal to enhance the frequency characteristics of the second vowel sound.

* * * * *